F. A. TURNER.
RESILIENT WHEEL.
APPLICATION FILED FEB. 13, 1917.
1,221,393.
Patented Apr. 3, 1917.
2 SHEETS—SHEET 1.
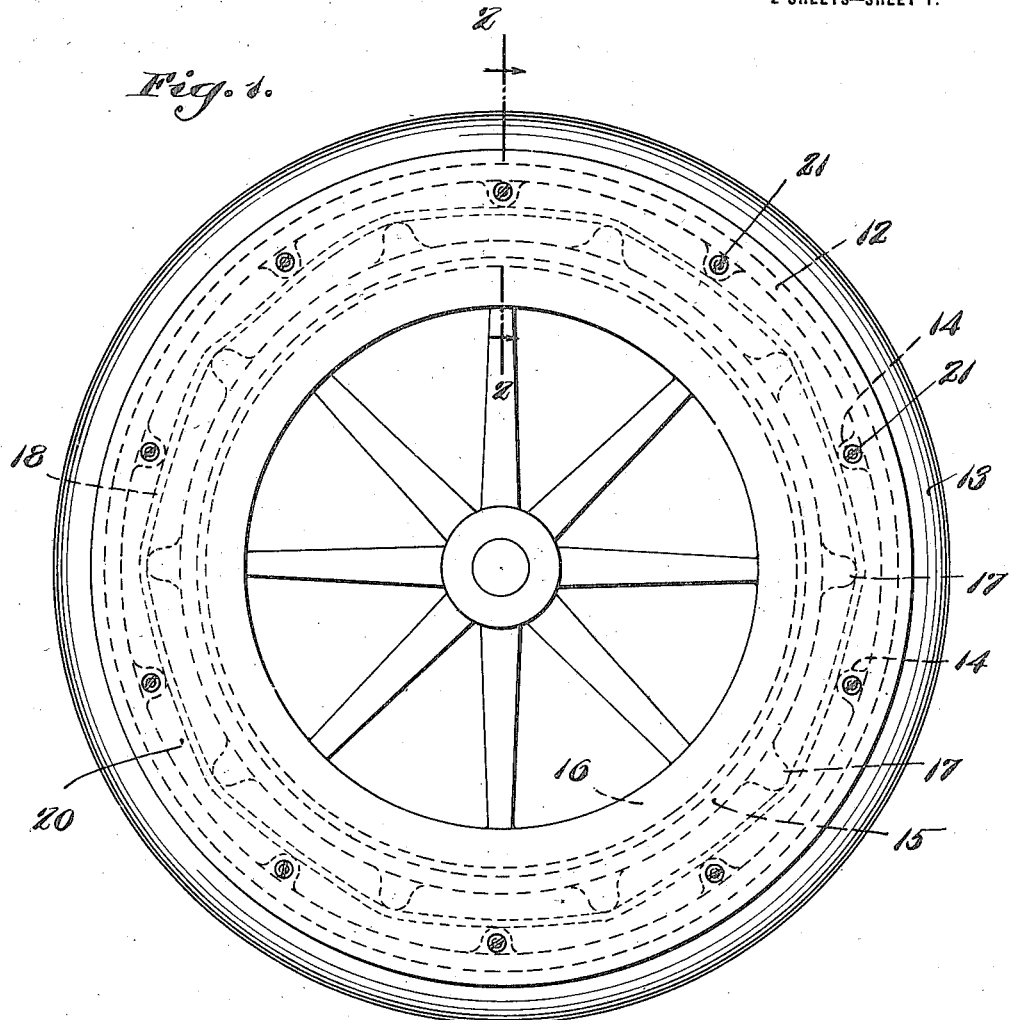
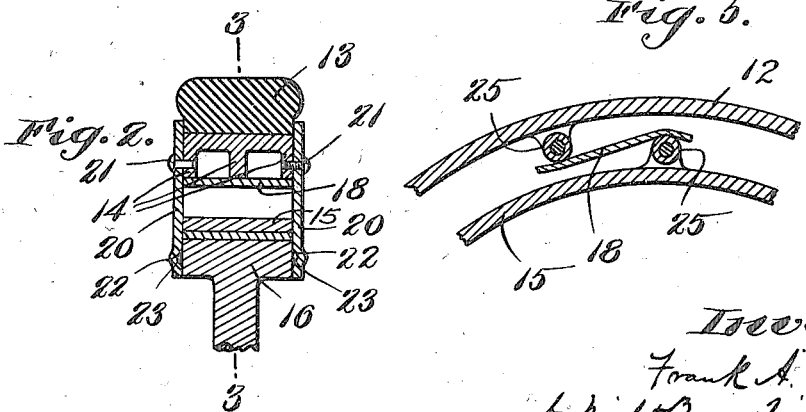

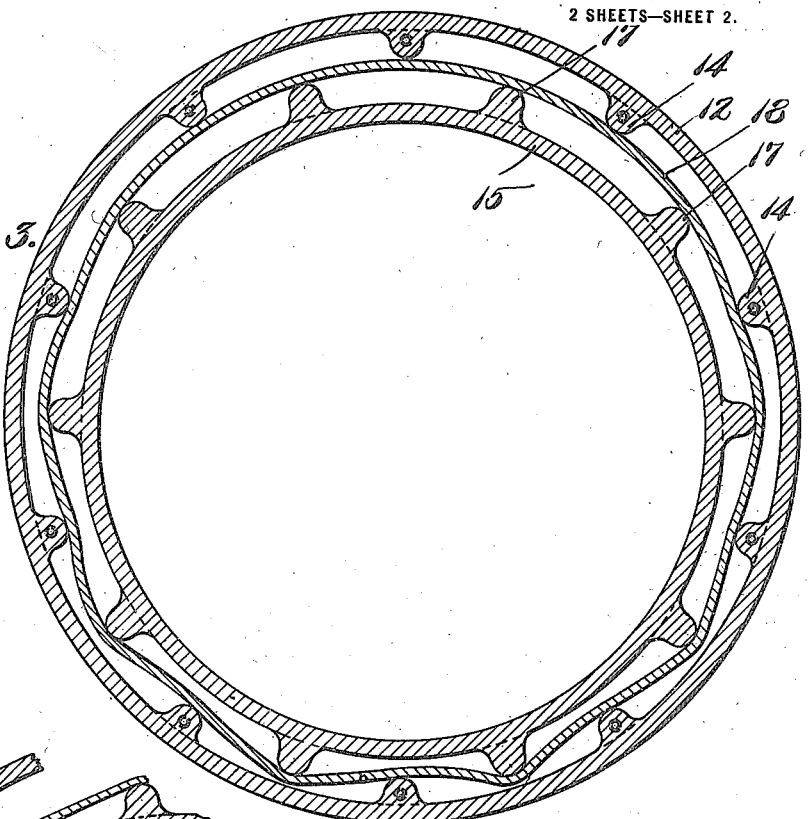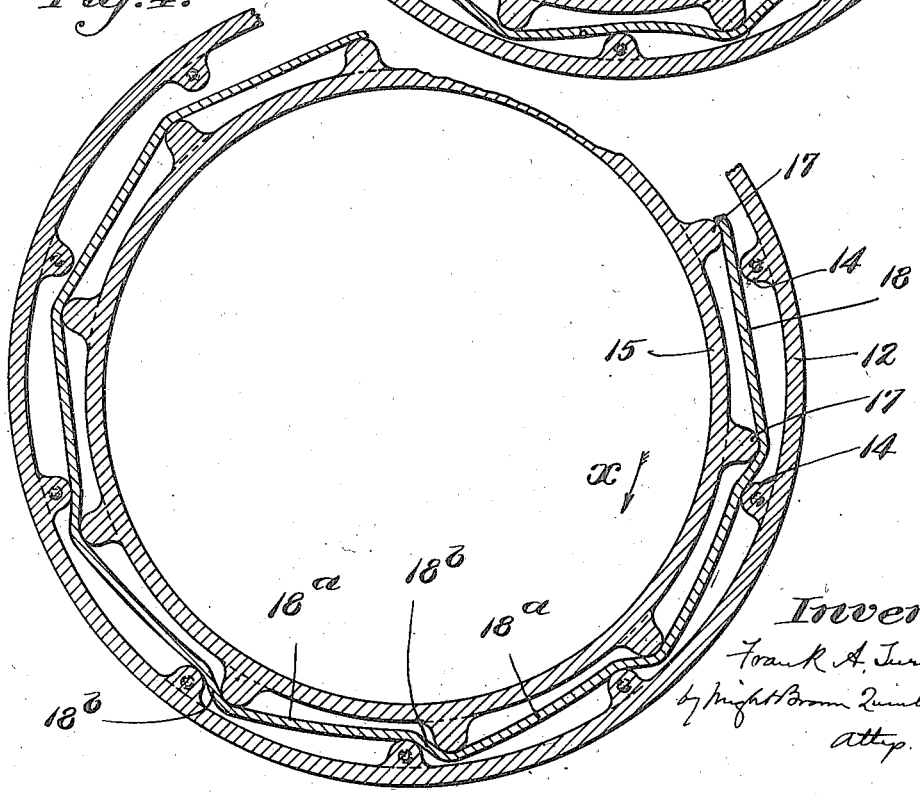

UNITED STATES PATENT OFFICE.

FRANK A. TURNER, OF BOSTON, MASSACHUSETTS, ASSIGNOR OF ONE-HALF TO JOSEPH M. JACKSON, OF BOSTON, MASSACHUSETTS, AND ONE-FOURTH TO ARTHUR E. KILHAM, OF BEVERLY, MASSACHUSETTS.

RESILIENT WHEEL.

1,221,393.

Specification of Letters Patent.

Patented Apr. 3, 1917.

Application filed February 13, 1917. Serial No. 148,349.

*To all whom it may concern:*

Be it known that I, FRANK A. TURNER, a citizen of the United States, residing at Boston, in the county of Suffolk and State of Massachusetts, have invented new and useful Improvements in Resilient Wheels, of which the following is a specification.

This invention relates to a resilient wheel which includes a rigid wheel body, a tire of considerably larger diameter than the diameter of the wheel body, so that the tire and the rim member of the wheel body are separated by an annular space, and resilient means interposed between the wheel body and the floating tire, permitting the wheel body to assume an eccentric position relative to the tire, under the influence of a load thereon, and when depressed by jolts and jars, said resilient means cushioning the wheel body and its load.

The object of the present invention is to enable the resilient cushioning means to also serve as a means for transmitting torque from the wheel body to the tire, when the wheel body is positively driven, and is, for example, the body of a driving-wheel of an automobile, the cushioning effect of the resilient means being unaffected by its function as a torque-transmitting means.

To the above and other related ends, the invention consists in the improvements which I will now proceed to describe and claim.

Of the accompanying drawings forming a part of this specification,—

Figure 1 is a side elevation of a resilient wheel embodying the invention, the relatively movable parts of the wheel being in the positions they occupy when the wheel body is not influenced by a load.

Fig. 2 is a section on line 2—2 of Fig. 1.

Fig. 3 is a section on line 3—3 of Fig. 2, omitting the wheel body and tire tread and showing the rim member hereinafter described depressed by a load thereon to a position eccentric with the floating tire, the wheel being at rest.

Fig. 4 is a view similar to Fig. 3, showing the conditions that prevail when the wheel body is driven and torque is being communicated to the floating tire.

Fig. 5 is a fragmentary sectional view showing antifriction rollers.

The same reference characters indicate the same parts in all of the figures.

In the drawings,—12 represents a floating annular tire or tire member, which is a practically rigid metallic ring and may have a rigid tread surface, although it is desirable to associate with the member 12 a tread member 13 having a resilient tread surface, the member 13 being, for example, an ordinary solid rubber tire.

The floating tire member 12 is provided with a series of uniformly spaced inwardly projecting protuberances 14, which I call outer bearings, since they bear upon the outer side of the endless floating spring member hereinafter described.

15 represents an annular rim member, forming, when in use, a rigid part of a wheel body, and here shown as a metal ring, secured in any suitable way to a rigid wheel rim, which may include a felly 16.

I desire it to be understood that my present invention does not relate in any way to the structure of the portion of the wheel body surrounded by the member 15.

The rim member 12 is provided with a series of spaced apart outwardly projecting proturbances 17, which I call inner bearings, because they bear on the inner side of the above-mentioned annular floating spring member.

18 represents an annular floating spring member of resilient and practically inextensible material, such as a strip of tempered steel, or a laminated strip, the ends of which are suitably connected to form an annulus.

In assembling the tire member 12 and rim member 15, the bearings 14 of the tire member are caused to alternate with the bearings 17 of the rim member and the annular spring member 18 is seated movably on the ends of all the bearings, as indicated by Fig. 1, and is free to slide thereon. The spring member thus arranged constitutes a resilient support for the wheel body and its load, and is adapted to normally hold the rim member 15 substantially concentric with the tire member 12, as shown by Fig. 1, when the wheel body is not influenced by a load.

When the wheel body is depressed by a load, the portions of the annular spring member 18 which bridge the spaces between adjacent outer bearings 14, yield to the weight of the rim member and its load, exerted through the inner bearings 17, and are flexed outwardly between adjacent outer bearings 14, the corresponding inner bearings 17 being at the same time depressed into the spaces between the outer bearings at the lower portion of the wheel.

This change in the relative positions of the parts causes in effect an interlocking engagement between the rim member and the floating tire, the bridging lower portions of the floating spring member being crowded between the adjacent outer bearings at opposite ends of the space bridged by said portions, and becoming torque-transmitting portions of the spring member.

When the wheel is at rest the spring-flexing inner bearings 17 are substantially midway between the adjacent spring-supporting outer bearings 14, as shown by Fig. 3, this being due to the fact that when the rim members and spring member are assembled, the spring member is under tension and exerts equal pressure on both the outer and inner bearings. When the spring member is under torque-transmitting flexure, as shown by Fig. 4, the resistance of the portion 18$^b$ to movement of an inner bearing thereon, rapidly increases until said movement is arrested. If, when the spring member and bearings are in the relative positions shown by Fig. 4, the load is removed or materially decreased, the strain or tension set up in the portion 18$^b$ of the spring member acts to restore the inner bearings 17 to a central position relatively to the outer bearings 14. By assembling the parts with the spring member under tension, which I consider preferable, I obviate any lost motion of the wheel body such as might be necessary to tension the spring member if the latter were not originally tensioned as described.

When the wheel body is rotated, say, in the direction indicated by the arrow $x$, in Fig. 4, the spring-flexing inner bearings 17 at the lower side of the wheel body move toward adjacent outer bearings 14 until they are arrested by the flexed portions of the floating spring member, as indicated by Fig. 4.

Owing to the inextensibility of the floating spring member, the independent movement of the rim member and its bearings 17 is arrested, while the flexed portions of the spring member are in a condition of non-symmetrical flexure, and before the inner bearings 17 can approach the outer bearings 14 sufficiently to cause interference between said bearings and reduce the cushioning effect. In other words, each flexed portion of the annular spring member, in the condition shown by Fig. 4, has a longer side 18$^a$ and a shorter side 18$^b$, the latter being caused by the inextensibility of the spring member to prevent the inner bearing 17 from closely approaching the outer bearing 14, so that each of the sides 18$^a$ and 18$^b$ has a suitable degree of resilience. At the same time, the abrupt flexure of the spring member at the portion 18$^b$ causes said portion to engage the adjacent outer bearing 14 with sufficient positiveness.

The floating tire is provided with annular plates or flanges 20, secured to it by fastening devices 21 and projecting inwardly and overlapping the edges of the rim member 15, said flanges being in sliding contact with the edges of the rim member, and their width being such that, under the described conditions, they cover the space between the rim member 15 and the outer member 12 and exclude dust and dirt from said space. The chief function of the flanges 20 is to maintain the floating tire 12 and spring member 18 against edgewise displacement relatively to the rim member 15 and the wheel body. The flanges 20 are preferably provided with annular grooves 22 in their inner sides, confining annular packings 23 of rubber or other suitable material, said packings being preferably circular or elliptical in cross section, and adapted to slide in contact with the sides of the felly, or other portion of the wheel body, and exclude water and dirt from the spring-containing space.

As shown by Fig. 1, the bearings 14 and 17 may be so proportioned that when the wheel body is not under the influence of a load and the rim member 15 and the floating tire member 12 are concentric with each other, the spring member 18 is flexed slightly inward by the outer bearings, and slightly outward by the inner bearings, this flexure being caused, for example, by making the inner bearings somewhat higher or deeper than the outer bearings. In other words, the outer ends of the inner bearing members 17 are normally farther from the center of the wheel than the inner ends of the outer bearings 14. The waves or undulations normally formed in the annular spring member by the outer and inner bearings, as last described, constitute incipient torque-transmitting portions, which are enlarged or amplified at the lower portion of the wheel by the action of the load, and become more pronounced torque-transmitting portions. This arrangement facilitates the torque-transmitting engagement above described, as will be readily seen.

The inextensibility of the annular spring member prevents extreme flexure of its torque-transmitting portions and contact of the same with the tire member 12, so that the clearance or space between said portions and the tire member may be reduced to a minimum.

The outer and inner bearings, or the bearings of either series may be formed by antifriction rollers 25 in rolling contact with the annular spring member, as shown by Fig. 5.

The rim member 15, the floating tire member 12, having the flanges 20, and the annular spring member 18, interposed between said members, constitute an attachment adapted to be applied as a unit to the felly or rim portion of a wheel body, which may be either of a variety of forms or styles, the tire member constituting a tire base adapted to engage an elastic, or other suitable member, constituting the tread portion of the floating tire.

As shown by Fig. 2, the flanges 20 project outwardly from the outer surface of the tire member 12, to provide means for engaging the base of the tread member 13.

The rim member 15 may be secured to the rim or felly portion of the wheel body in any suitable way. For example, said rim member may be pressure-applied like the usual rim member which engages a pneumatic or other tire, or it may be demountably engaged like the usual demountable rim member. Since the means for securing the rim member 15 to the wheel body is not a part of the present invention, I do not deem it necessary to illustrate such means.

When the invention is embodied in a wheel, the body of which is not motor-driven, the tire being rotated by contact with the road, and torque being transmitted from the tire to the body, the torque-transmitting portions of the annular spring member do not acquire the pronounced non-symmetrical flexure shown by Fig. 4, but remain in substantially or approximately the form shown by Fig. 3.

I claim:

1. In a resilient wheel, in combination, a floating annular tire member of rigid material, having a series of spaced outer bearings, a rigid annular rim member, having a series of spaced inner bearings, alternating with said outer bearings, and an inextensible annular floating spring member interposed between said members in sliding contact with said bearings, said spring member normally maintaining the rim member substantially concentric with the tire member, and the bearings of one member substantially central relatively to those of the other member, and being locally flexible by the action of a load on the rim member to form resilient inextensible torque-transmitting portions which yieldingly support the rim member and its load under all conditions of torque-transmission.

2. In a resilient wheel, in combination, a floating annular tire member of rigid material, having a series of spaced outer bearings, a rigid annular rim member, having a series of spaced inner bearings, alternating with said outer bearings, and an inextensible annular floating spring member interposed between said members in sliding contact with said bearings, said spring member normally maintaining the rim member substantially concentric with the tire member, and the bearings of one member substantially central relatively to those of the other member, and being locally flexible by the action of a load on the rim member to form resilient inextensible torque-transmitting portions which yieldingly support the rim member and its load under all conditions of torque-transmission, the said bearings being formed to normally maintain alternating outwardly and inwardly projecting waves in the spring member forming incipient torque-transmitting portions.

3. A resilient wheel comprising a floating annular tire member provided with a plurality of equally spaced outer bearings, a wheel body having its periphery provided with a plurality of equally spaced inner bearings alternating with the outer bearings, and an annular inextensible spring member interposed between the tire member and the wheel body and in slidable contact with the ends of all of said bearings, said spring member being free to creep circumferentially of the wheel body, whereby a limited relative radial movement of the tire member and the wheel body is permitted when a load is applied, and portions of the spring member are flexed between contiguous inner and outer bearings, the spring member and wheel body being free to move to a position eccentric to the tire member when said load is applied, the flexed portions of the inextensible spring member providing a driving connection between the bearings carried by the wheel body and the tire member.

4. A resilient wheel comprising a floating annular tire member provided with a plurality of equally spaced outer bearings, a wheel body having its periphery provided with a plurality of equally spaced inner bearings alternating with said outer bearings, the outer ends of the inner bearings being normally farther away from the center of the wheel than the inner ends of the outer bearings, and an annular inextensible spring member interposed between the tire member and the wheel body and in slidable contact with the ends of all of said bearings, said spring member being free to creep circumferentially of the wheel body, whereby a limited relative radial movement of the tire member and the wheel body is permitted when a load is applied, and portions of the spring member are flexed between contiguous inner and outer bearings, the spring member and the wheel body being free to move to a position eccentric to the tire member when said load is applied, said inextensible spring member possessing sufficient body to cause the flexed portions thereof to provide a resilient driving connection between the bearings carried by the wheel body and the rim.

In testimony whereof I have affixed my signature.

FRANK A. TURNER.